United States Patent
Fleuchaus et al.

(10) Patent No.: US 6,842,950 B2
(45) Date of Patent: Jan. 18, 2005

(54) SHIELDLESS HOOK AND LOOP FASTENER

(75) Inventors: Kurt Fleuchaus, Belle River (CA); Hugh C. Pekrul, Stoney Point (CA)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/125,945

(22) Filed: Apr. 19, 2002

(65) Prior Publication Data

US 2003/0197414 A1 Oct. 23, 2003

(51) Int. Cl.[7] .................................................. A44B 1/04
(52) U.S. Cl. ........................... 24/442; 24/443; 428/100; 428/119; 428/120
(58) Field of Search .......................... 428/100, 99, 119, 428/120, 900; 24/442, 443

(56) References Cited

U.S. PATENT DOCUMENTS

| | | | | |
|---|---|---|---|---|
| 4,842,916 A | * | 6/1989 | Ogawa et al. | 428/100 |
| 4,881,997 A | * | 11/1989 | Hatch | 156/66 |
| 5,171,395 A | * | 12/1992 | Gilcreast | 156/500 |
| 5,180,618 A | * | 1/1993 | Kessler et al. | 428/100 |
| 5,422,156 A | * | 6/1995 | Billarant | 428/100 |
| 5,500,268 A | * | 3/1996 | Billarant | 428/100 |
| 5,606,781 A | * | 3/1997 | Provost et al. | 24/452 |
| 5,688,576 A | * | 11/1997 | Ohno et al. | 428/100 |
| 5,766,723 A | * | 6/1998 | Oborny et al. | 428/100 |
| 5,786,061 A | * | 7/1998 | Banfield | 428/100 |
| 5,900,303 A | | 5/1999 | Billarant | |
| 6,439,537 B1 | * | 8/2002 | Fujisawa et al. | 249/85 |
| 6,537,643 B1 | * | 3/2003 | Poulakis | 428/100 |
| 6,596,371 B1 | * | 7/2003 | Billarant et al. | 428/99 |

* cited by examiner

Primary Examiner—Laurie K. Cranmer
(74) Attorney, Agent, or Firm—Clark Hill PLC

(57) ABSTRACT

A fastener secures a trim cover to a foam pad. The fastener is positionable within a mold trench, which extends between a plurality of ends having stepped regions. The fastener includes a base having a mold surface and a foam surface opposite to the mold surface. The base extends between a plurality of base ends and longitudinal sides. The fastener also includes a plurality of trim cover attachment members extending outwardly from the mold surface for securing the trim cover thereto. In addition, the fastener includes a plurality of sealing flats that sealingly engage each of the stepped regions to prevent foam from flowing past the stepped regions and onto the plurality of trim cover attachment members on the mold surface.

10 Claims, 4 Drawing Sheets

SHIELDLESS HOOK AND LOOP FASTENER

BACKGROUND OF THE INVENTION

1. Field of the Invention

This invention relates to a fastener for securing a trim cover to a foam pad. In particular, this invention relates to a trim cover fastener that is bonded to the foam pad during the molding of the foam pad.

2. Description of Related Art

Many surfaces within a passenger compartment of a motor vehicle require padding for comfort reasons. Aesthetically, materials used to pad surfaces lack the desired finish. Therefore, trim covers are employed to cover the padding so the look and feel of the padded surfaces is aligned with expectations of those occupying the passenger compartment.

Manufacturing methods typically utilize foam and mold processes to create the padding used for interior trim components and seat assemblies. Once the foam has been molded to a desired shape, it must be covered. These methods are labor intensive.

One method for securing a trim cover to a piece of molded foam, e.g., a seat cushion, is to mold fasteners into the foam cushion as it is molded and cured. In this securing method, a fastener extends along a portion of the foam cushion surface. The fastener has a plurality of trim cover attachment members extending out therefrom to receive and secure the trim cover to the foam cushion. An example of this type of fastener is disclosed in U.S. Pat. No. 5,900,303. In this patent, the trim cover attachment members extend out from a fastener body across the entire length thereof.

A problem associated with this type of manufactured foam cushion arises because it is difficult to mold the fasteners and the foam together without having the foam flow around the fastener body eliminating the ability of the fastener to secure a trim cover thereto. The above-mentioned reference attempts to overcome this problem by sealing the ends of the fasteners with a sealant. This solution is not desirable because it does not completely prevented intrusion of foam around the fasteners. This is because the ends of the fastener are not securely positioned within the mold. Thus, foam may seep through small spaces between the ends of the fasteners and the mold. As a result, the trim cover attachment members on the fastener assemblies are partially covered with foam and the attachment of the trim cover to the foam pad is weakened.

If it is determined that too much foam has covered the fastener, further treatment of the fastener assembly is required to remove the foam. This cleaning process introduces irregularities in the manufacturing process, additional costs, and increased cycle times.

SUMMARY OF THE INVENTION

A fastener secures a trim cover to a foam pad. The fastener is positionable within a mold trench of a mold for receiving foam. The fastener includes a base having a mold surface and a foam surface opposite thereto. The base extends between a plurality of base ends and longitudinal sides. The fastener also includes a plurality of trim cover attachment members extending outwardly from the mold surface for securing the trim cover thereto. In addition, the fastener includes a plurality of sealing flats sealingly engaging each of the stepped regions to prevent foam from flowing therepast. Each of the plurality of sealing flats is fixedly secured to each of the plurality of base ends.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
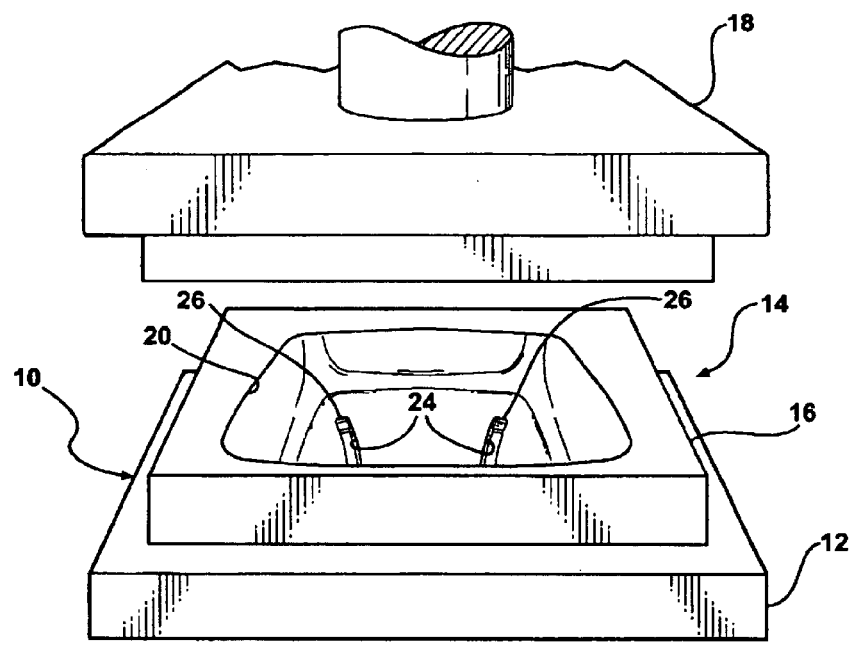
FIG. 1 is a perspective view of a tooling member including a platen supporting a mold.

Referring to FIG. 1, a tooling member, generally indicated at 10, includes a platen 12 supporting a mold, generally shown at 14. The mold 14 includes a lower mold 16 and an upper mold 18. The lower mold 16 is fixed to the platen 12 while the upper mold 18 is movable relative to the lower mold 16. The upper mold 18 moves between a closed position in which various moldable materials, such as foam, may be injected into a mold cavity 20 and an open position (shown in FIG. 1) in which the upper mold 18 is moved away from the lower mold 16 allowing a resulting foam pad to be removed therefrom. In the closed position, the lower mold 16 and the upper mold 18 together define the mold cavity 20 for receiving such moldable materials.

Figure 2:
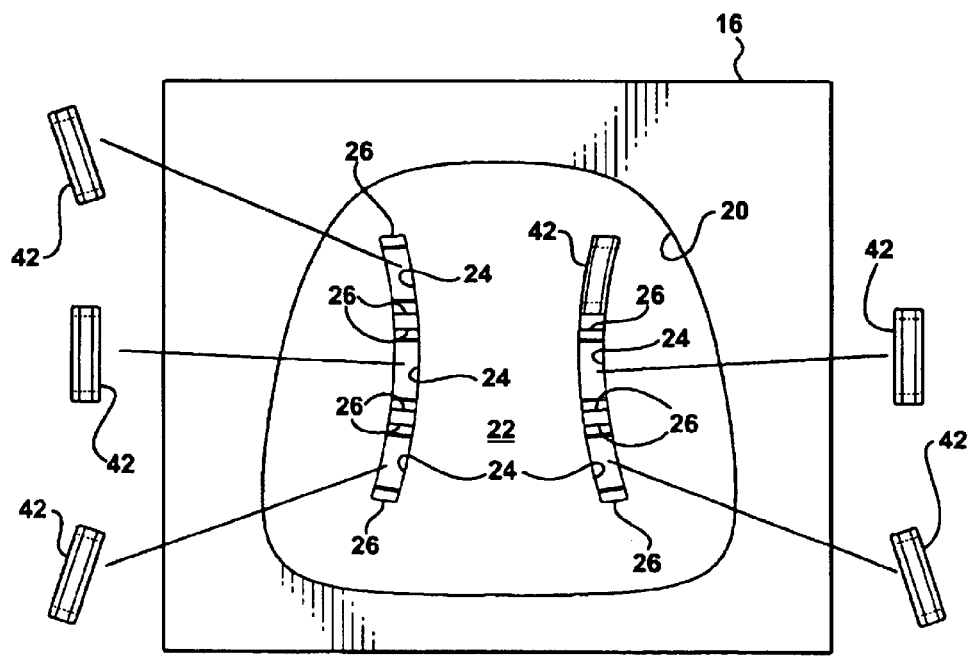
FIG. 2 is a top view of a lower mold of the mold defining a mold trench having a plurality of ends.

Referring to FIG. 2, the lower mold 16 includes a bottom mold surface 22, which delineates the bottom of the mold cavity 20. The bottom mold surface 22 defines mold trenches 24 extending between a plurality of ends 26. It is contemplated that any number of mold trenches 24 may be formed within the bottom mold surface 22. And although each mold trench 24 is shown having two ends 26, it is also contemplated that each mold trench 24 could have more than two ends 26. For example, the mold trench 24 may be T-shaped having three ends 26.

Figure 3:
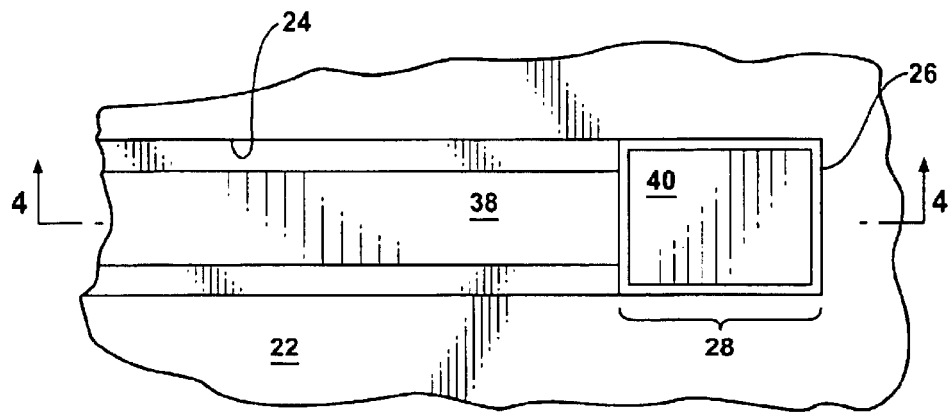
FIG. 3 is a partially cut-away, top view of one of the plurality of ends including a stepped region formed thereat.
Figure 4:
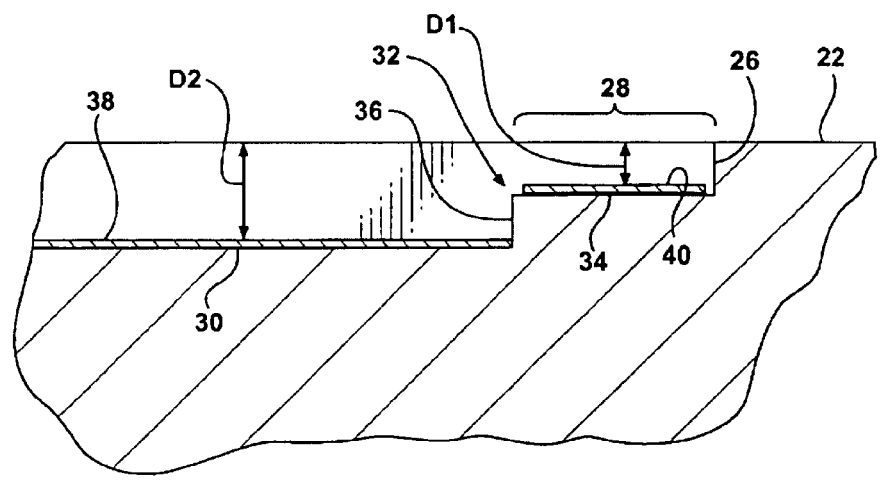
FIG. 4 is a cut-away, cross-sectional, side view of the stepped region of one of the plurality of ends taken along lines 4—4 in FIG. 3.

Referring to FIGS. 3 and 4, each one of the plurality of ends 26 of the mold trench 24 includes a stepped region, generally indicated at 28. A mold trench floor 30 extends between the stepped regions 28 at each of the plurality of ends 26 of the mold trench 24. The stepped region 28 includes a step, generally shown at 32, having a raised horizontal surface 34 and a vertical surface 36 extending between the raised horizontal surface 34 and the mold trench floor 30. The step 32 has a step depth D1 defined as the distance between the horizontal surface 34 of the step 32 and the bottom mold surface 22 of the lower mold 16 disposed adjacent the mold trench 24. The mold trench 24, meanwhile, has a trench depth D2 defined as the distance between the mold trench floor 30 and the bottom mold surface 22 of the lower mold 16 disposed adjacent the mold trench 24. The depth D1 of the step 32 is less than the depth D2 of the mold trench 24.

The mold trench floor 30 includes a strip 38 of ferromagnetic material extending between each of the stepped regions 28 for retaining a fastener within the mold trench 24, as will be described in detail below. The strip 38 is bonded to the mold trench floor 30 with adhesive. The strip 38 creates a magnetic field to which a fastener, generally indicated at 42, is susceptible. Therefore, the strip 38 helps to retain the fastener 42 within the mold trench 24. The mold trench floor 30 may be configured to accommodate placement of the strip 38 therein.

An end magnet 40 is placed upon the horizontal surface 34 of the step 32 in each stepped region 28. The end magnet 40 is bonded to the horizontal surface 34 with adhesive. The end magnet 40 retains the fastener 42 against the horizontal surface 34 of the step 32 by creating a magnetic field to which the fastener 42 is susceptible. This magnetism assists in holding the base ends 50 of the fastener 42 to the horizontal surface 34 of the step 32.

Figure 5:
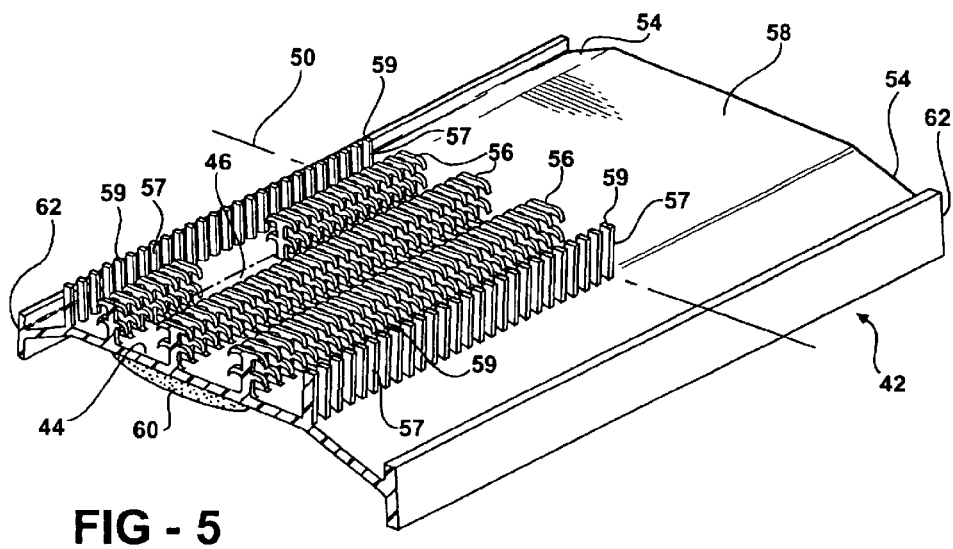
FIG. 5 is a cut away, perspective view of a fastener of one embodiment of the invention showing a mold surface and a plurality of trim cover attachment members extending therefrom.
Figure 6:
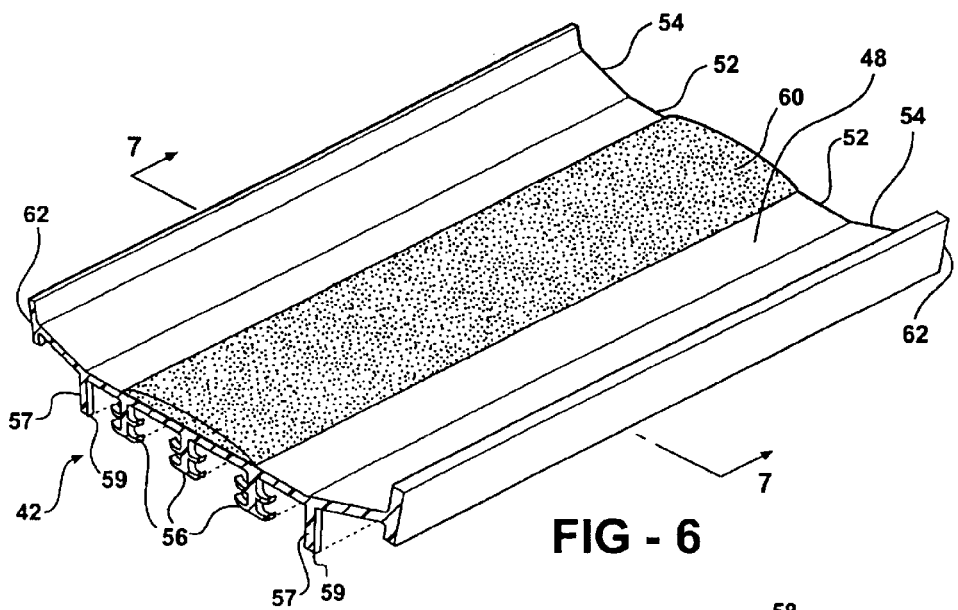
FIG. 6 is a cut away, perspective view of a foam surface of the fastener of one embodiment of the invention.
Figure 8:
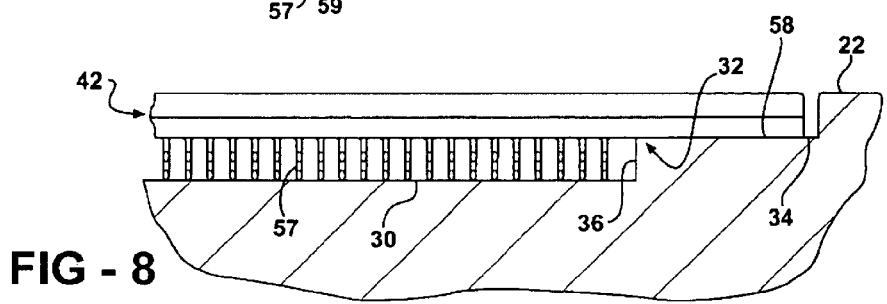
FIG. 8 is a cross sectional, side view, partially cut away, of the stepped region of one of the ends of the mold trench shown in FIG. 4 with the fastener of one embodiment of the invention placed thereon.

Referring to FIGS. 5 and 6, the fastener 42 includes a base 44 having a mold surface 46 and a foam surface 48 opposite the mold surface 46. The mold 46 and foam 48 surfaces extend along all of the base 44. The mold 46 and foam 48 surfaces are generally parallel to each other. The mold 46 and the foam 48 surfaces are flat.

The fastener 42 is positioned within the mold trench 24 during molding so that the mold surface 46 thereof is facing the mold trench floor 30. The base 44 extends between a plurality of base ends 50 and longitudinal sides 52. The mold surface 46 of the base 44 defines a plane extending between the plurality of base ends 50 and longitudinal sides 52.

A plurality of sealing arms 54 extends along the length of each of the plurality of longitudinal sides 52. Each of the plurality of sealing arms 54 extends out from the base 44 at an angle thereto and includes a flange 55 extending out from the sealing arms 54 generally perpendicular thereto. The flanges 55 directly engage the mold trench 24. Each of the plurality of sealing arms 54 engages the mold trench 24 to secure the fastener 42 within the mold trench 24 and to seal the mold trench 24 during the molding process. As the foam is placed into the lower mold 16, the engagement of the plurality of sealing arms 54 with the mold trench 24 prevents any foam from seeping around the foam surface 48 of the fastener 42 and onto the mold surface 46.

The mold surface 46 of the fastener 42 includes a plurality of trim cover attachment members 56 extending outwardly therefrom. The plurality of trim cover attachment members 56 may be in the form of hooks or loops depending on the form of a plurality of complementary receiving members 72 extending from a trim cover 70 (shown in FIG. 9). The plurality of trim cover attachment members 56 secure the trim cover 70 to a foam pad or seat cushion 64 by engaging the plurality of complementary receiving members 72 of the trim cover 70. This engagement allows the trim cover 70 to remain secured to the foam pad 64 during normal wear-and-tear of a motor vehicle seat (not shown).

The fastener 42 also includes a plurality of guide members 57. The plurality of guide members 57 is a single row of spike-like projections that extend out from the mold surface 46. There is a single line of the plurality of guide members 57 extending along each of the plurality of longitudinal sides 52. The plurality of guide members 57 has squared-off distal ends 59 and are of the same general dimension as the plurality of trim cover attachment members 56.

The fastener 42 also includes a plurality of sealing flats 58 extending within the plane of the mold surface 46. Each of the plurality of sealing flats 58 is fixedly secured to each of the plurality of base ends 50. Each of the plurality of sealing flats 58 has a flat surface. The sealing flats 58 do not have trim cover attachment members 56 thereon. Thus, the mold surface 46 is exposed along the sealing flats 58. Each of the plurality of sealing flats 58 completely engages all of the stepped region 28 of the mold trench 24 when the fastener 42 is positioned within the mold trench 24. Each fastener 42 may be of varying length so long as each of the plurality of sealing flats 58 rests on the stepped region 28 of the mold trench 24.

A resin bead 60 extends between the plurality of base ends 50 and sealing flats 58 along the foam surface 48 parallel to the plurality of longitudinal sides 52. The resin bead 60 is formed from a ferromagnetic material. The resin bead 60 is magnetically susceptible to the magnetic fields created by the magnetic strip 38 extending along the mold trench floor 30 and to the end magnets 40 on the steps 32 of the stepped regions 28. Upon positioning of the fastener 42, the resin bead 60 is pulled toward the magnetic strip 38 and the end magnet 40. The magnetic susceptibility, along with the abutting engagement each of the plurality of sealing arms 52 has with the mold trench 24, holds the fastener 42 in place as the foam pad 64 is molded and cured.

Even though the resin bead 60 does not directly face both the strip 38 and the end magnet 40 (since the resin bead 60 is on the foam surface 48 and it is the mold surface 46 that faces the strip 38 and the end magnet 40), the magnetic forces of the strip 38 and the end magnets 40 are sufficient to affect the resin bead 60 to assist holding the fastener 42 within the mold trench 24.

Figure 7:
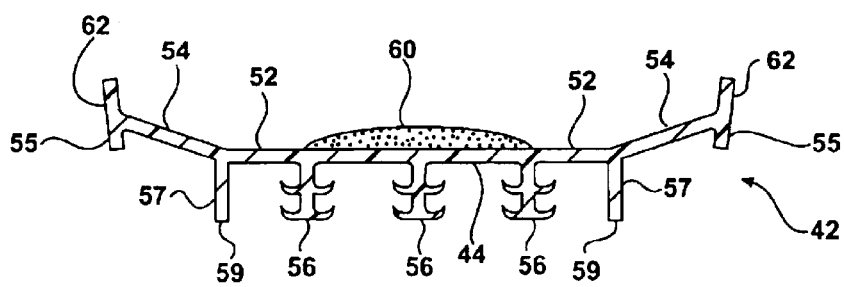
FIG. 7 is a cross-sectional view of the fastener of one embodiment of the invention taken along lines 7—7 in FIG. 6.

Referring to FIG. 7, a plurality of anchors 62 extends upwardly from each of the plurality of sealing arms 54. In the embodiment shown, each of the plurality of anchors 62 complements each of the rounded ends 55 of the sealing arms 54. Each of the plurality of anchors 62 extends continuously along the length of each of the plurality of sealing arms 54. The plurality of anchors 62 may be of any appropriate shape so long as the plurality of anchors 62 assists in anchoring the fastener 42 within the foam pad 64, as described below.

In operation, the fastener 42 is positioned within the mold trench 24 so that the mold surface 46 of the fastener 42 is facing the mold trench floor 30, and each of the plurality of sealing flats 58 of the fastener 42 is laid over the horizontal surface 34 of the step 32 in the stepped region 28. The magnetic strip 38 and the end magnet 40 create a magnetic field that attracts the resin bead 60, thus retaining the fastener 42 within the mold trench 24 and allowing the plurality of sealing flats 58 to be held on the horizontal surface 34 of the step 32. In addition, the sealing arms 54 of the plurality of longitudinal sides 52 engages the mold trench 24 to seal the mold trench 24 so that foam does not seep through the space between the plurality of longitudinal sides 52 and the mold trench 24. The fastener 42 is also securely held within the mold trench 24 by the fastener 42 being pre-cut to a length at which each of the plurality of base ends 50 of the fastener 42 abuts each of the plurality of ends 26 of the mold trench 24.

Figure 9:
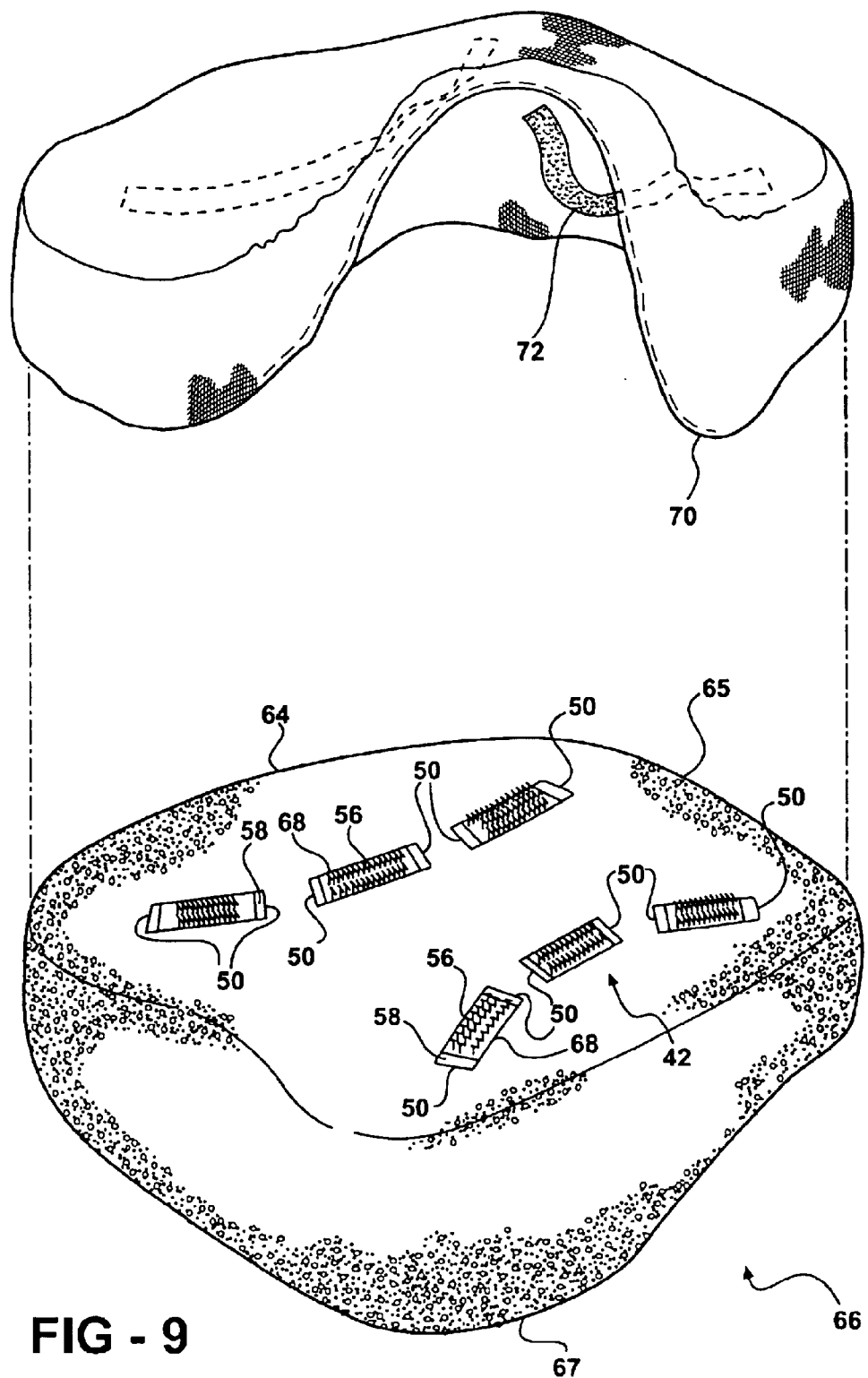
FIG. 9 is a partially exploded view of a seat cushion assembly including a foam pad having the fastener of one embodiment of the invention secured within a channel thereof, and a trim cover to be secured to the foam pad.

With the fastener 42 secured within the mold trench 24, the upper mold 14 is closed down upon the lower mold 16 and the mold cavity 20 is filled with foam. Because each of the plurality of sealing flats 58 is tightly held against the stepped region 28, there is no space between the fastener 42 and the mold trench 24 for foam to seep therepast. The foam is cured and the foam pad 64, as shown in FIG. 9, is formed with the fastener 42 bonded thereto. During the molding process, the foam forms around each of the plurality of anchors 62, thus anchoring the fastener 42 within the foam pad 64. The foam pad 64 in the Figures has a seating surface 65 upon which a motor vehicle occupant will sit and a support surface 67 opposite to the seating surface 65. It should be appreciated by those skilled in the art that the foam pad 64 may be something other than a seat cushion.

A cushion assembly 66 includes the foam pad 64, a plurality of channels 68, and the fastener 42 secured within each of the plurality of channels 68. A fastener 42 is positioned within each of the plurality of channels 68 so that each of the plurality of trim cover attachment members 56 extends outwardly therefrom. The foam pad 64 is then covered by the trim cover 70. The trim cover 70 includes the plurality of complementary receiving members 72 extending therefrom and aligned thereon so as to engage the plurality of trim cover attachment members 56 of the fastener 42 as the trim cover 70 is secured to the foam pad 64.

In a method for forming the seat cushion assembly 66, the fastener 42 is applied within the mold trench 24 of the mold 14 so that each of the plurality of sealing flats 58 rests upon the stepped region 28 of each of the plurality of ends 26. Next, the mold 14 is filled with foam. As the foam fills the mold 14 it contacts the foam surface 48 of the fastener 42. But because of the tight seal formed between each of the plurality of sealing flats 58 and the stepped region 28 of the mold trench 24, the foam does not seep through to the mold surface 46 of the fastener 42. The foam is then cured to form the foam pad 64 with the fastener 42 bonded thereto. The foam pad 64 may then be covered with the trim cover 70.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A fastener for securing a trim cover to a foam pad, said fastener positionable within a mold trench of a mold for receiving foam, the mold trench defining a trench depth and extending between a plurality of ends having stepped regions defining a step depth more shallow than the trench depth, said fastener comprising:

a base having a mold surface and a foam surface opposite thereto, said mold surface defining a plane between a plurality of base ends and longitudinal sides;

a plurality of trim cover attachment members extending outwardly from said mold surface for securing the trim cover thereto;

a plurality of sealing flats sealingly engaging each of the stepped regions to prevent foam from flowing therepast, each of said plurality of sealing flats fixedly secured to each of said plurality of base ends and extending within said plane of said mold surface; and a plurality of sealing arms defining a length and extending along each of said plurality of longitudinal sides, said plurality of sealing arms engaging the mold trench to secure said fastener within the mold trench and to seal the mold trench from the foam.

2. A fastener as set forth in claim 1 wherein each of said plurality of sealing arms extends along each of said plurality of sealing flats.

3. A fastener as set forth in claim 2 including a plurality of anchors fixedly secured to each of said plurality of sealing arms and extending out therefrom, said plurality of anchors securing said fastener to the foam pad.

4. A fastener as set forth in claim 3 wherein each of said plurality of anchors extends continuously along each of said plurality of sealing arms over said length thereof.

5. A fastener as set forth in claim 4 wherein each of said plurality of anchors extends along each of said plurality of sealing flats.

6. A fastener as set forth in claim 5 wherein each of said plurality of sealing flats is magnetized.

7. A fastener as set forth in claim 6 wherein each of said plurality of sealing flats includes a magnetic flat that is magnetically susceptible.

8. A fastener as set forth in claim 7 including a resin bead secured to said foam surface and extending along said plurality of longitudinal sides.

9. A fastener as set forth in claim 8 wherein said plurality of trim cover attachment members includes hooks.

10. A fastener as set forth in claim 8 wherein said plurality of trim cover attachment members includes loops.

* * * * *